United States Patent
MacDonald

(10) Patent No.: US 11,974,556 B2
(45) Date of Patent: May 7, 2024

(54) SYSTEMS AND METHODS FOR COUPLING A FISHING REEL TO A FISHING ROD

(71) Applicant: Philip J. MacDonald, Salt Lake City, UT (US)

(72) Inventor: Philip J. MacDonald, Salt Lake City, UT (US)

(*) Notice: Subject to any disclaimer, the term of this patent is extended or adjusted under 35 U.S.C. 154(b) by 100 days.

(21) Appl. No.: 17/724,663

(22) Filed: Apr. 20, 2022

(65) Prior Publication Data

US 2022/0346359 A1 Nov. 3, 2022

Related U.S. Application Data

(60) Provisional application No. 63/181,081, filed on Apr. 28, 2021.

(51) Int. Cl.
*A01K 87/06* (2006.01)

(52) U.S. Cl.
CPC .................................... *A01K 87/06* (2013.01)

(58) Field of Classification Search
CPC .... A01K 87/06; A01K 87/008; A01K 87/009; A01K 87/00; A01K 87/002; A01K 7/005; A01K 87/02; A01K 87/025; A01K 87/04; A01K 87/08; A01K 87/085
See application file for complete search history.

(56) References Cited

U.S. PATENT DOCUMENTS

| | | | | |
|---|---|---|---|---|
| 553,725 A | * | 1/1896 | Roll | A01K 87/06 43/22 |
| 1,371,261 A | * | 3/1921 | Price | A01K 87/00 43/18.1 R |
| 4,823,498 A | * | 4/1989 | Banta | A01K 97/00 43/25 |
| 10,407,826 B2 | * | 9/2019 | Rymer | D07B 3/103 |
| 10,993,424 B1 | * | 5/2021 | Morse | A01K 87/06 |
| 2011/0239518 A1 | * | 10/2011 | Zuckerman | A01K 87/06 43/22 |
| 2012/0317866 A1 | * | 12/2012 | Doucet | A01K 97/00 43/25 |
| 2013/0180157 A1 | * | 7/2013 | Doucet | A01K 97/00 43/25 |

* cited by examiner

*Primary Examiner* — Darren W Ark
*Assistant Examiner* — Katelyn T Truong
(74) *Attorney, Agent, or Firm* — David B. Tingey; K. Russell Griggs; Kirton McConkie

(57) ABSTRACT

In some cases, the described reel coupler includes a rod coupler base that couples to a fishing rod, and a reel coupler base that couples to a fishing reel, and that selectively couples to the rod coupler base via a coupling mechanism. In some cases, the coupling mechanism includes a process on either the rod or the reel coupler base, and a corresponding recess in the other of the rod and the reel coupler base, with the process being configured to slidingly mate with the recess. In some cases, the reel coupler includes a lock that is configured to move between a locked position where a first portion of the lock blocks a portion of the process to prevent the process in the recess from sliding out of the recess, and a release position where the lock allows the process to slidingly decouple from the recess. Other implementations are described.

20 Claims, 16 Drawing Sheets

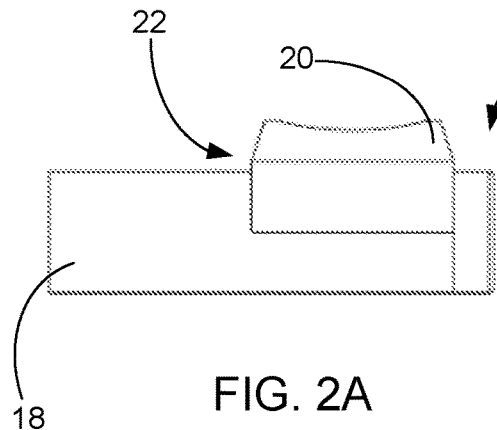
FIG. 2A
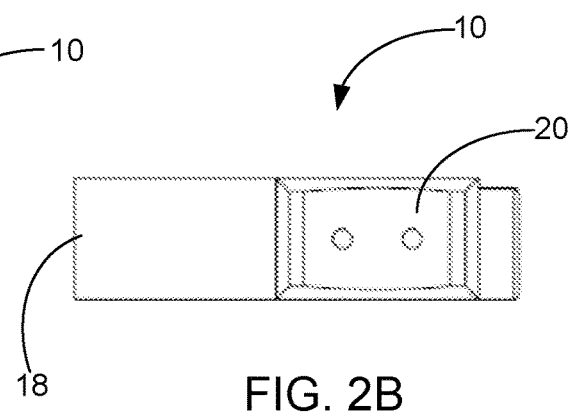
FIG. 2B
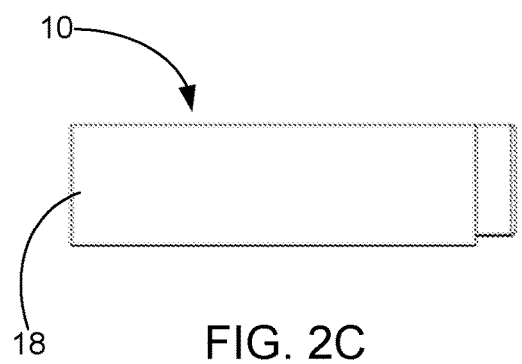
FIG. 2C
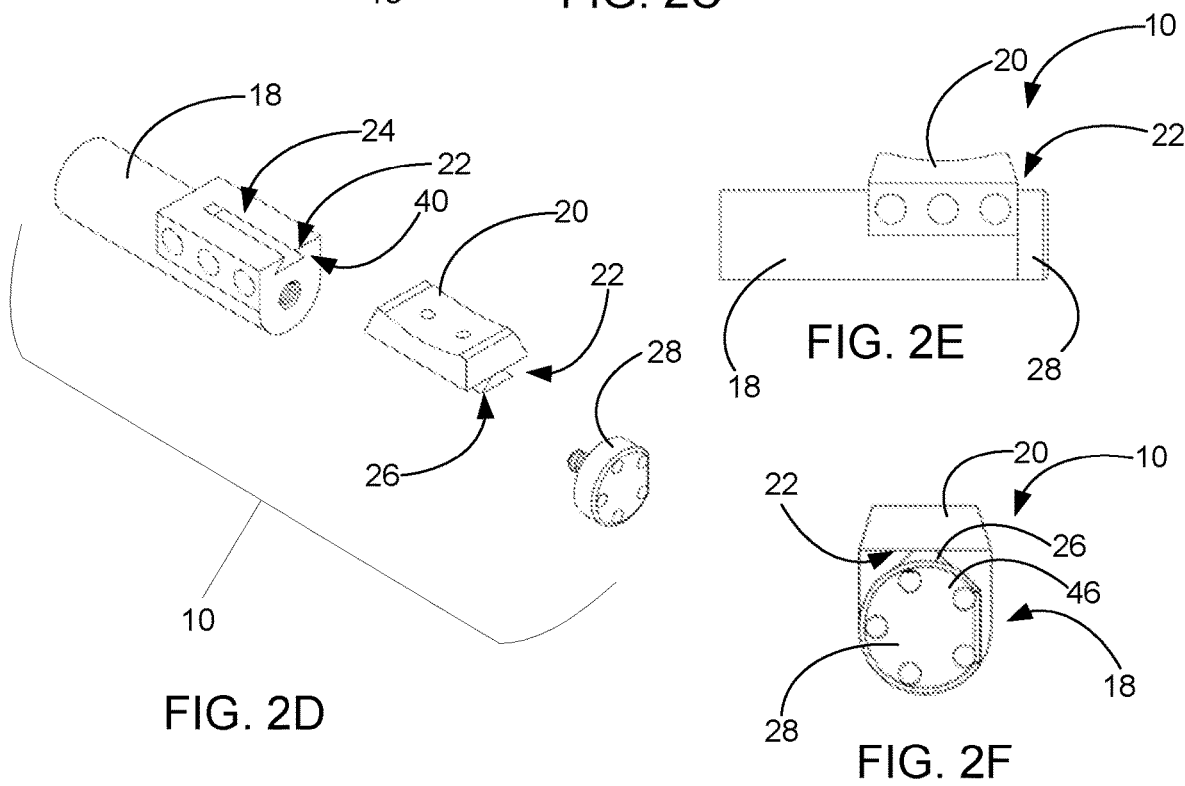
FIG. 2D
FIG. 2E
FIG. 2F

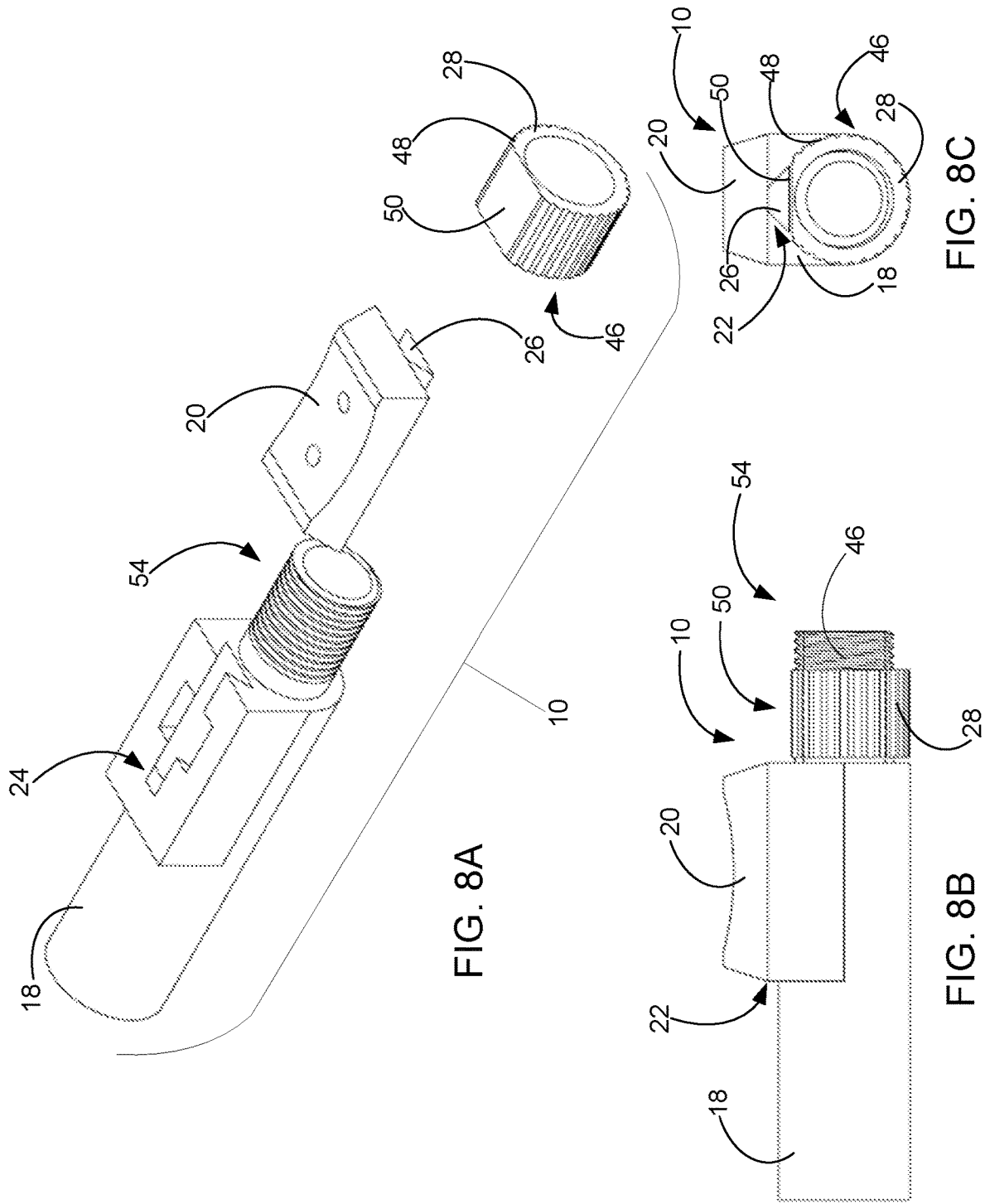

SYSTEMS AND METHODS FOR COUPLING A FISHING REEL TO A FISHING ROD

RELATED APPLICATIONS

This application claims priority to U.S. Provisional Patent Application Ser. No. 63/181,081 filed Apr. 28, 2021, entitled SYSTEMS AND METHODS FOR COUPLING A FISHING REEL TO A FISHING ROD, the entire disclosure of which is hereby incorporated by reference.

FIELD

The described systems and methods relate to fishing rods (or fishing poles). More particularly, some implementations relate to systems and methods for selectively coupling a fishing reel to a fishing rod, and for selectively decoupling the fishing reel from the fishing rod, via a fishing reel coupler.

BACKGROUND AND RELATED ART

Generally speaking, a fishing rod (or pole) includes a long, flexible rod that is used to catch fish. While there are a variety of fishing rods with a wide variety of characteristics, a fishing rod typically includes an elongated rod blank made from fiberglass, graphite, carbon fiber, bamboo, and/or a variety of other resilient materials. A typical fishing rod includes a handle at its bottom (or butt) end, with one or more guides or eyelets that are disposed between the handle and the top (sometimes called the "tip top") of the rod.

In many cases, the fishing rod is configured to couple to a fishing reel. In some such cases, once the reel is coupled to the fishing rod, fishing line from the reel is threaded through the guides such that one or more hooks, pieces of bait, jigs, lures, pieces of tackle, flies, weights, snaps, sinkers, swivels, bobbers, and/or any other suitable fishing rig can be coupled to an end of the line. In this regard, the fishing reel is typically configured to release fishing line, such that the hook or another rig at the end of the line can be cast, fly cast, dropped, trolled, and/or otherwise be allowed to extend away from the fishing rod. Moreover, in many cases, the reel is configured to be actuated to pull the fishing line back into the reel (e.g., to reel in: a fish, the fishing line, and/or a rig on the line).

While the fishing reel can be disposed in any suitable location, in some cases, the reel is coupled to the fishing rod between the handle and the guides, within a portion of the handle (e.g., between a butt end of the handle and a foregrip of the handle), and/or at a bottom (or butt) end of the fishing rod. Thus, in some cases, the rod is held in one hand, while the reel is actuated by the other.

In many cases (such as when backpacking, traveling, putting a fishing pole in a car, storing a fishing pole, and/or otherwise moving a fishing rod) it can be beneficial to separate the fishing reel from the fishing rod. While there are a variety of techniques and mechanisms that are used to separate a fishing reel from a fishing rod, such techniques and mechanisms are not necessarily without their shortcomings. For instance, some mechanisms for separating a fishing reel from a fishing pole can be relatively time consuming to use, can require a relatively large amount of strength, can slowly damage the mechanisms due to wear and tear, and/or can otherwise be less than ideal to use.

Thus, while systems and methods currently exist that are used to couple fishing reels to fishing rods (and to decouple the reels from the rods), some challenges still exist, including those listed above. Accordingly, it would be an improvement in the art to augment or even replace current techniques with other techniques.

SUMMARY

The described systems and methods relate to fishing rods (or fishing poles). More particularly, some implementations relate to systems and methods for selectively coupling a fishing reel to a fishing rod, and for selectively decoupling the fishing reel from the fishing rod, via a fishing reel coupler. While the fishing reel coupler can include any suitable component, in some cases, it includes a rod coupler base that couples to a fishing rod, and a reel coupler base that couples to a fishing reel, and that selectively couples to the rod coupler base via a coupling mechanism. In some cases, the coupling mechanism includes a process on either the rod or the reel coupler base, and a corresponding recess in the other of the rod and the reel coupler base, with the process being configured to slidingly mate with the recess. In some cases, the reel coupler includes a lock that is configured to move between a locked position where a first portion of the lock blocks a portion of the process to prevent the process in the recess from sliding out of the recess, and a release position where the lock allows the process to slidingly decouple from the recess.

These and other features and advantages of the described systems and methods will be set forth or will become more fully apparent in the description that follows and in the appended claims. The features and advantages may be realized and obtained by means of the instruments and combinations particularly pointed out in the appended claims. Furthermore, the features and advantages of the described systems and methods may be learned by the practice thereof or will be obvious from the description and drawings, as set forth hereinafter.

BRIEF DESCRIPTION OF THE DRAWINGS

In order that the manner in which the above-recited and other features and advantages of the present systems and methods are obtained, a more particular description of the described systems and methods will be rendered by reference to specific embodiments thereof, which are illustrated in the appended drawings. Understanding that the drawings are not necessarily drawn to scale or in proper proportion, and that the drawings depict only typical embodiments of the described systems and methods and are not, therefore, to be considered as being limiting in scope, the described systems and methods will be described and explained with additional specificity and detail through the use of the accompanying drawings in which:

FIG. 2A illustrates a side, elevation view of the fishing reel coupler in accordance with a representative embodiment;

FIG. 2B illustrates a top, plan view of the fishing reel coupler in accordance with a representative embodiment;

FIG. 2C illustrates a bottom, plan view of the fishing reel coupler in accordance with a representative embodiment;

FIG. 2D illustrates an exploded, perspective view of the fishing reel coupler in accordance with a representative embodiment;

FIG. 2E illustrates a side, perspective view of the fishing reel coupler in accordance with a representative embodiment;

FIG. 2F illustrates an end, elevation view of the fishing reel coupler in accordance with a representative embodiment;

FIGS. 8A-8C respective illustrate an exploded, side perspective view; a side, elevation view, and an end elevation view of the fishing reel coupler in accordance with some representative embodiments.

DETAILED DESCRIPTION

The described systems and methods relate to fishing rods (or fishing poles). More particularly, some embodiments relate to systems and methods for selectively coupling a fishing reel to a fishing rod, and for selectively decoupling the fishing reel from the fishing rod, via a fishing reel coupler. While the described fishing reel coupler can include any suitable component, in some embodiments, it includes a rod coupler base that couples to a fishing rod, and a reel coupler base that couples to a fishing reel, and that selectively couples to the rod coupler base via a base coupler coupling mechanism. In some embodiments, the coupling mechanism includes a process on either the rod or the reel coupler base, and a corresponding recess in the other of the rod and the reel coupler base, with the process being configured to slidingly mate with the recess. In some embodiments, the reel coupler includes a reel coupler base lock that is configured to move between a locked position (where a first portion of the lock is configured to block a portion of the process in the recess so as to prevent the process from sliding out of the recess), and a release position (where the lock allows the process to slidingly decouple from the recess).

Figure 1A:
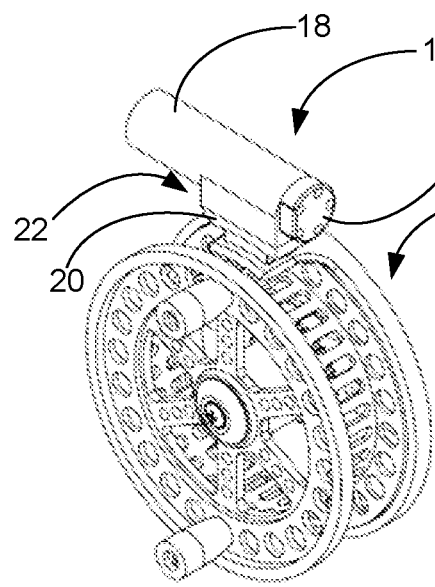
FIGS. 1A-1C each illustrate a perspective view of a fishing reel coupled to the described fishing reel coupler in accordance with some representative embodiments.
Figure 1B:
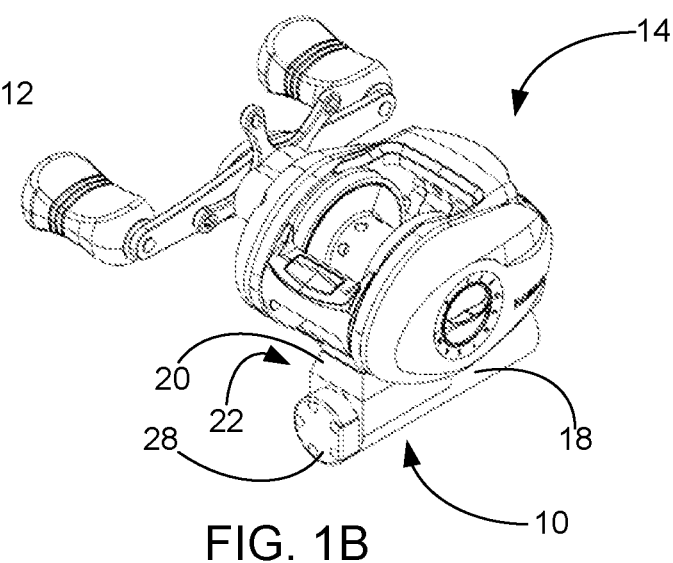
Figure 1C:
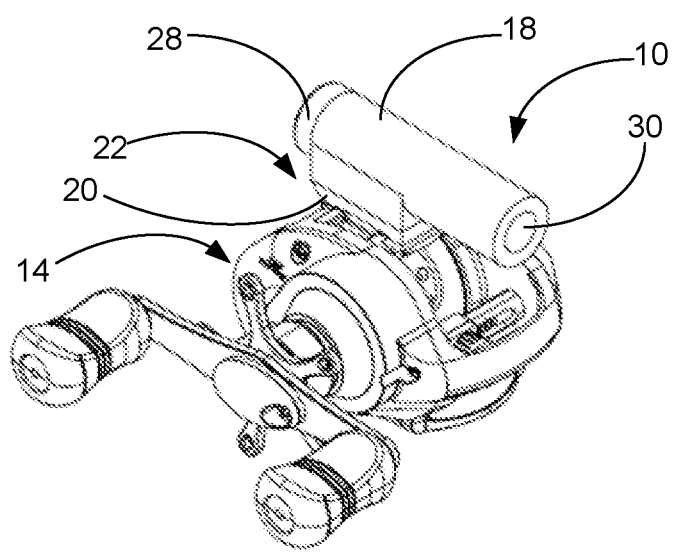

While the described fishing reel coupler can perform any suitable function, in some embodiments, it is configured to selectively couple a fishing reel to a rod, and to allow the fishing reel to be selectively decoupled from the rod relatively easily. In this regard, the fishing reel coupler can be used to couple any suitable type of fishing reel to any suitable type of fishing rod. Some non-limiting examples of suitable fishing reels that can be used with the describe fishing reel coupler include one or more spinning reels, spincast reels, fly reels (or fly fishing reels), baitcasting reels, trolling reels, and/or any other suitable type of reels. By way of non-limiting illustration, FIG. 1A shows an embodiment in which the fishing reel coupler 10 is coupled to a fly fishing reel 12. Moreover, FIGS. 1B-1C show some embodiments in which a bait casting reel 14 is coupled to the fishing reel coupler 10.

Figure 1D:
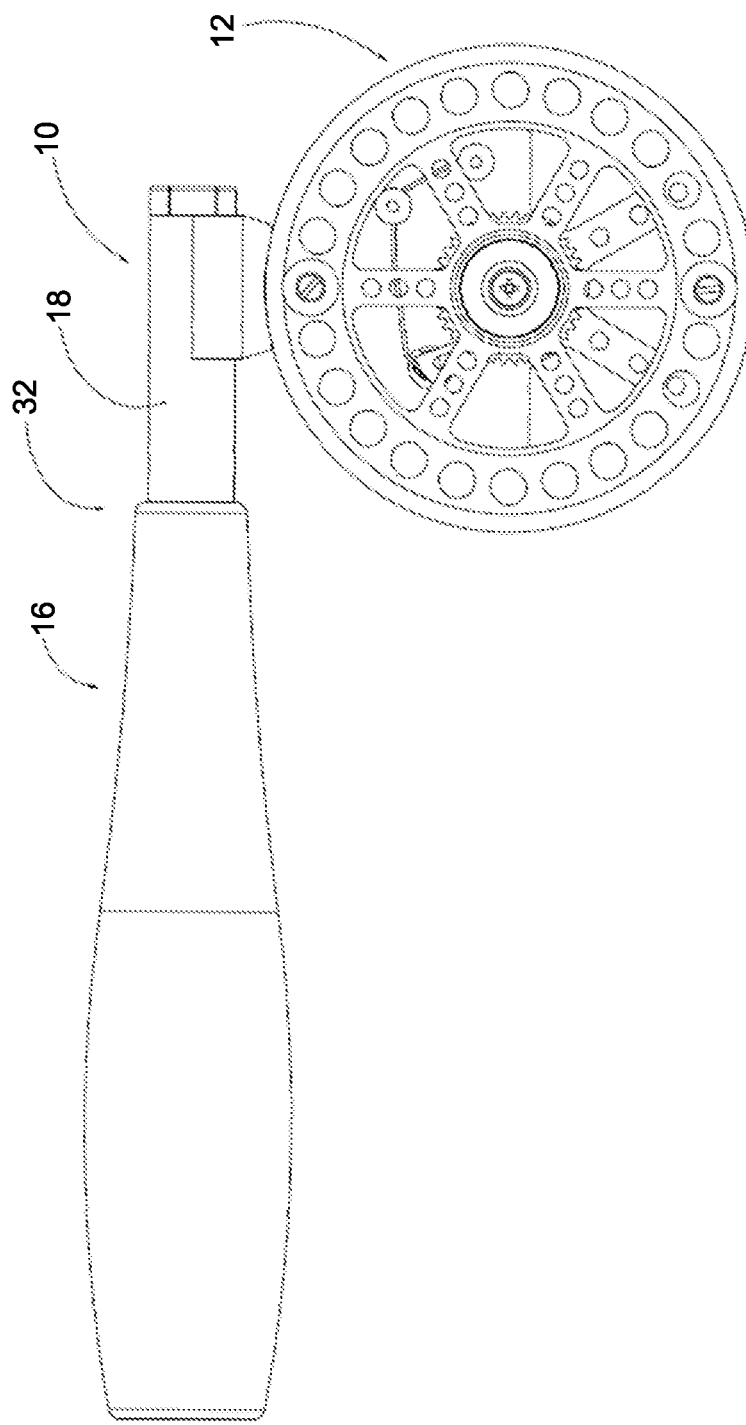
FIG. 1D illustrates a perspective view of the fishing reel coupler coupled to a fly fishing rod in accordance with a representative embodiment.
Figure 1E:
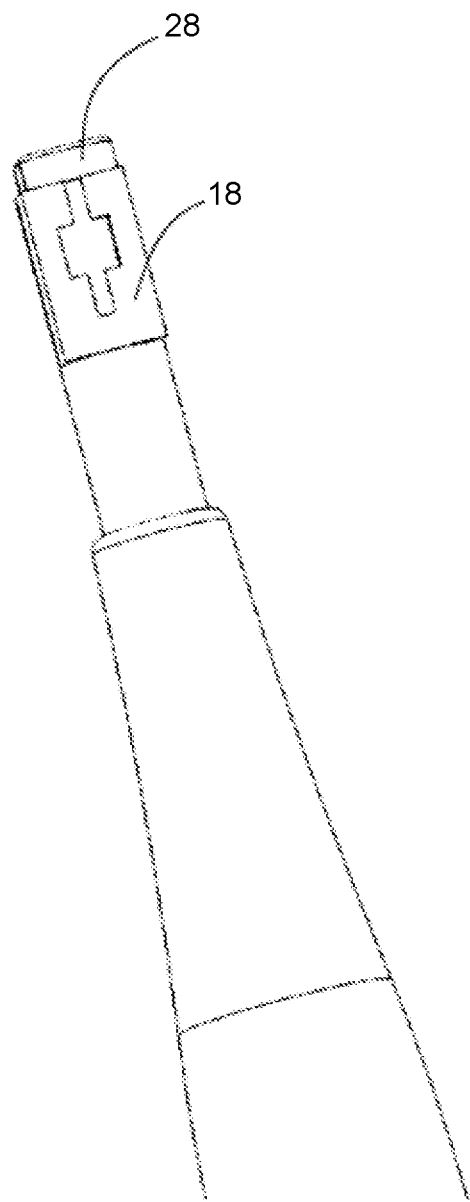
FIGS. 1E-1K show various views depicting a rod coupler base being coupled to a fishing rod 16 and a reel coupler base being coupled to a fishing reel in accordance with some representative embodiments.
Figure 1F:
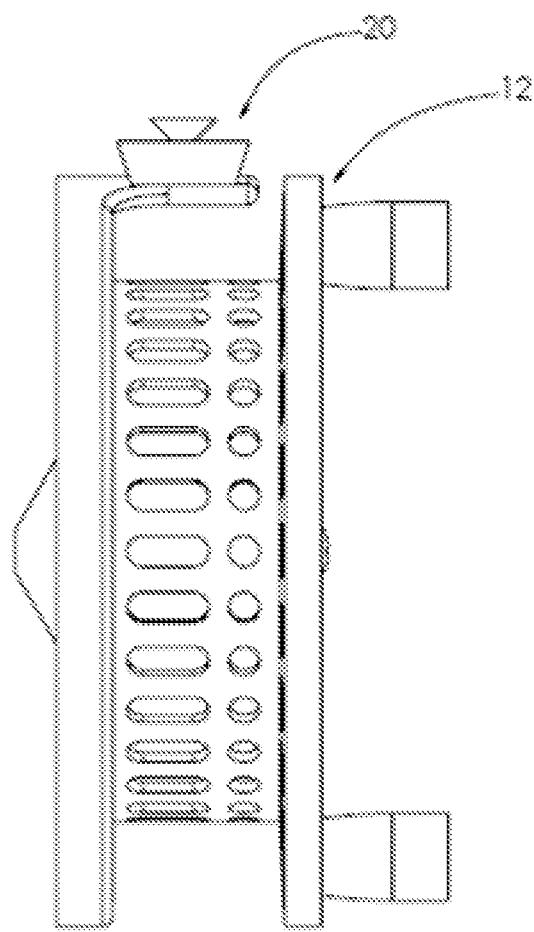
Figure 1G:
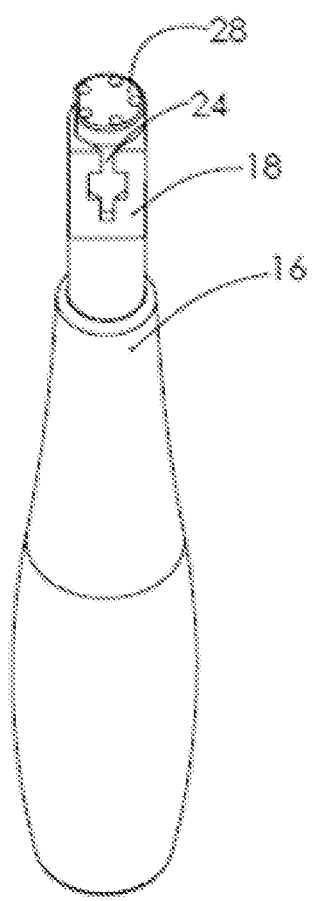
Figure 1H:
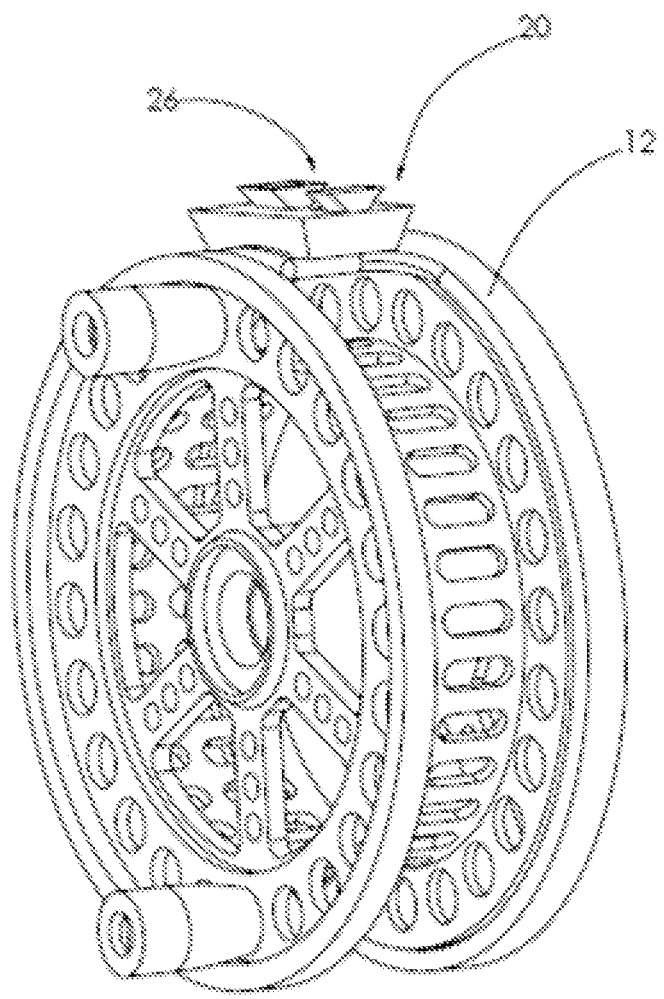
Figure 1I:
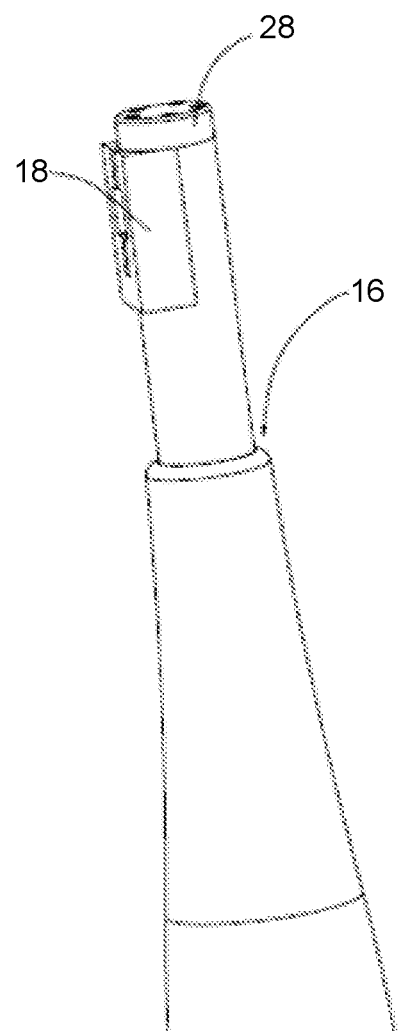
Figure 1J:
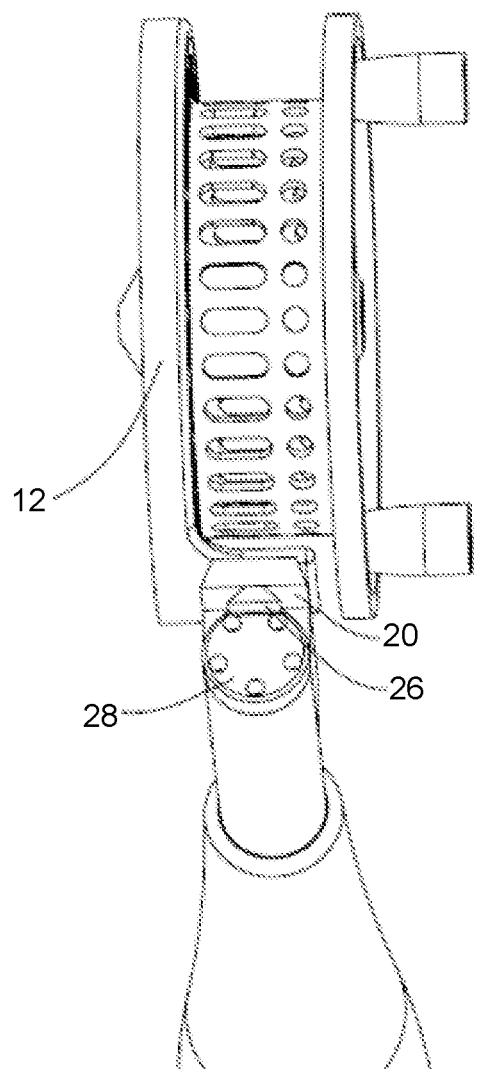
Figure 1K:
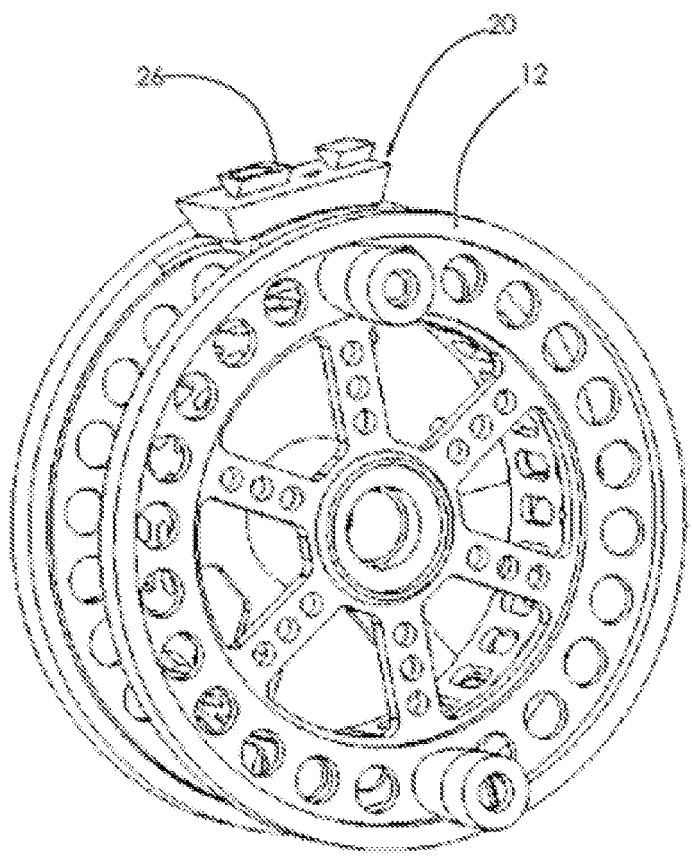

Furthermore, some non-limiting examples of suitable fishing rods include one or more casting rods, spin-cast rods, baitcasting rods, spinning rods, fly rods, telescopic rods, surf rods, surf casting rods, sea fishing rods, trolling rods, ice fishing rods, boat rods, two-piece rods, multi-jointed rods, and/or any other suitable type of rod. By way of non-limiting illustration, FIG. 1D shows an embodiment in which the fishing reel coupler 10 is coupled to a fly fishing rod 16. Moreover, FIGS. 1E-1K show various embodiments in which the rod coupler base 18 is coupled to a fly fishing rod 16 and in which the reel coupler base 20 is coupled to a fly fishing reel 12.

The described fishing reel coupler 10 can comprise any suitable component that allows it to selectively couple one or more fishing reels to one or more fishing rods. By way of non-limiting illustration, FIGS. 2A-2F show some embodiments in which the fishing reel coupler 10 comprises one or more rod coupler bases 18, reel coupler bases 20, base coupler coupling mechanisms 22 (e.g., recesses 24 and/or processes 26 that are configured to mate with each other), reel coupler base locks 28, and/or any other suitable component.

With reference to the rod coupler base 18, the rod coupler base can comprise any suitable component and/or characteristic that allows it to couple to a fishing rod and/or a fishing rod blank and/or to be selectively coupled to and decoupled from the reel coupler base 20. Indeed, in some embodiments, the rod coupler base comprises two or more components that are configured to be coupled together (e.g., via one or more screws, hinges, fasteners, coupling mechanisms, slides, frictional engagements, mechanical engagements, clamps, catches, and/or in any other suitable manner that allows the rod coupler base to extend around a portion of a fishing rod and/or rod blank). In accordance with some other embodiments, however, the rod coupler base is screwed into, inserted into, clamped onto, and/or otherwise coupled to a butt end of the fishing rod and/or its handle. In yet another example of a suitable method for coupling the rod coupler base to a fishing rod, FIG. 1C shows that the rod coupler base 18 comprises an internal recess 30 (e.g., a tube) that is configured to receive and/or to be coupled to a portion of fishing rod. Indeed, in some such embodiments, a butt end (or the top end) of the fishing pole is inserted into the internal recess, and the rod coupler base is moved to any suitable location on the fishing rod (e.g., near a butt end and/or a handle of the rod).

The rod coupler base 18 can couple to any suitable portion of the fishing rod. Indeed, in some embodiments, the rod coupler base couples: to a butt end of the rod, in front of one or more handles on the rod (e.g., between a top end of the handle and the guides on the rod), between two portions of the handle (e.g., between a foregrip and a butt (or aft) grip), within a handle portion of the rod, and/or in any other suitable location. By way of non-limiting illustration, FIG. 1D shows an embodiment in which the rod coupler base 18 is coupled at a butt end 32 of the fishing rod 34.

The rod coupler base 18 can couple to a fishing rod in any suitable manner. Indeed, in some embodiments, the rod coupler base is: twisted onto a butt portion of the rod; slid over an end of the rod; coupled around a portion of the rod (e.g., like a clam shell); glued or otherwise adhered to a portion of the rod; taped to the rod; fitted with a portion of the rod frictionally engaged within the rod coupler base; coupled to one or more arbors, which in turn are coupled to the rod; coupled to the rod with one or more fasteners (e.g., clamps, screws, threaded engagements, pins, nails, rivets, crimps, and/or any other suitable type of fastener); integrally formed with the rod; retrofit to the rod; and/or is otherwise coupled to the rod. In some embodiments, for instance, a portion of the rod at a butt end of the rod is inserted into the rod coupler base and one or more screws extend through the rod coupler base and abut and/or are screwed into the rod. Moreover, while in some embodiments, fishing rods are manufactured to include the fishing reel coupler, in some other embodiments, the fishing rod coupler is configured to be added to a conventional pole, after the pole has been purchased and/or manufactured.

Figure 3A:
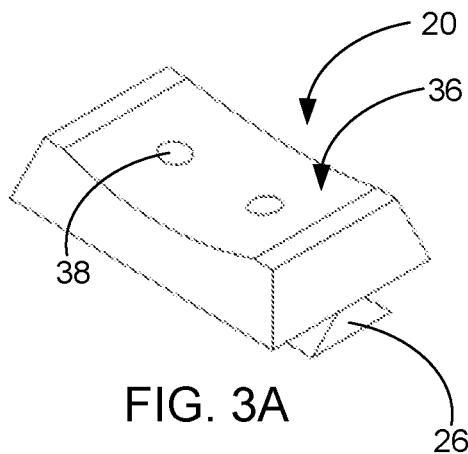
FIG. 3A illustrates a side, perspective view of a reel coupler base in accordance with a representative embodiment.
Figure 3B:
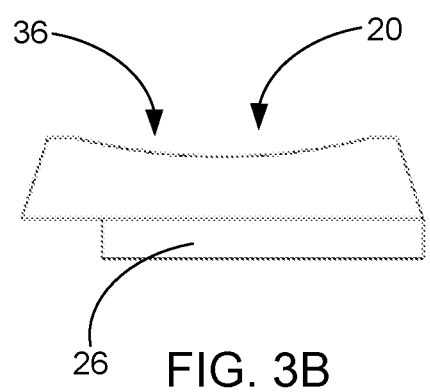
FIG. 3B illustrates a side, elevation view of the reel coupler base of FIG. 3A.

With reference now to the reel coupler base 20, the reel coupler base can have any suitable component and/or characteristic that allows it to be coupled to a fishing reel and that also allows it to selectively couple the reel and/or the reel coupler base to the rod coupler base 18. Indeed, in some embodiments, the reel coupler comprises one or more: recessed seats that are configured to cradle a portion of a fishing reel (e.g., a fly reel 12 and/or any other suitable type of reel, as shown in FIGS. 1A-1B), flat surfaces, surfaces to which one or more reel feet on a fishing reel are configured to be coupled (e.g., via one or more tightenable hoods, screws, adhesives, welds, catches, straps, frictional engagements, mechanical engagements, fasteners, and/or other suitable fastening mechanisms can be used to couple a fishing reel to the reel coupler base), clamps, worm gear clamps that are configured to be tightened to draw one or more hoods (and/or any other suitable reel feet clamps, catches, and/or bindings) closer together to couple a reel foot to the reel coupler base, and/or any other suitable characteristic or component that allows the reel coupler base to be coupled to a fishing reel. By way of non-limiting illustration, FIGS. 3A and 3B show some embodiments in which the reel coupler base 20 comprises a recessed surface 36 that is configured to receive a portion of a fishing reel.

Figure 3C:
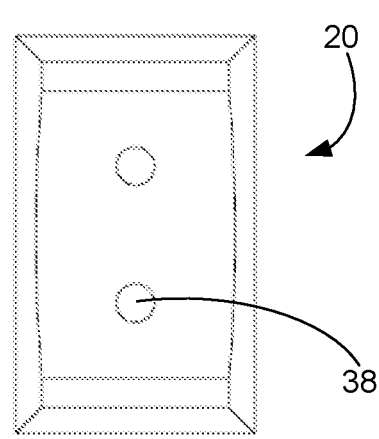
FIG. 3C illustrates a top, plan view of the reel coupler base of FIG. 3A.
Figure 3D:
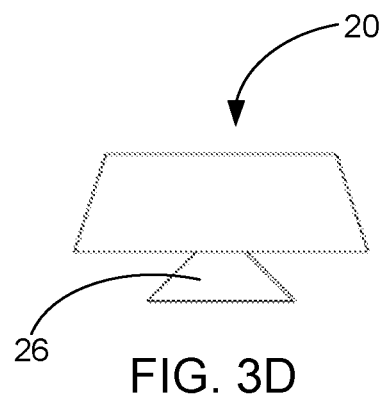
FIG. 3D illustrates a front, elevation view of the reel coupler base of FIG. 3A.
Figure 3E:
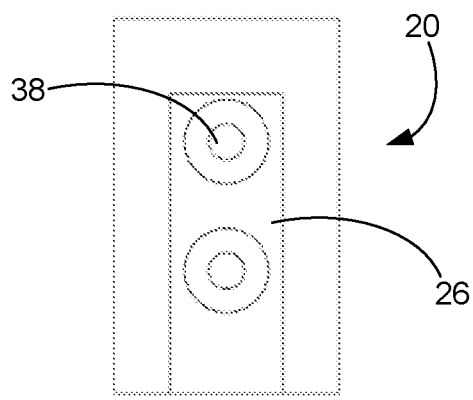
FIG. 3E illustrates a bottom, plan view of the reel coupler base of FIG. 3A.

The reel coupler base 20 can be coupled to a fishing reel in any suitable manner (including, without limitation, as described above). In some embodiments, however, one or more fasteners (e.g., screws, bolts, rivets, pins, and/or any other suitable type of fastener) are used to couple the reel coupler base to the fishing reel. By way of non-limiting illustration, FIGS. 3C and 3E show that, in some embodiments, the reel coupler base 20 comprises one or more holes 38 through which one or more screws, rivets, and/or fasteners pass to couple the reel coupler base to a fishing reel.

In some embodiments, instead of being attached to the reel via one or more fasteners, the reel coupler base 20 is integrally formed with and/or coupled to a fishing reel. Thus, in some embodiments, one or more reels are initially manufactured and/or sold with the described reel coupler base.

With reference to the base coupler coupling mechanism 22, the coupling mechanism can include any suitable components and/or or characteristics that allow it to selectively couple the rod coupler base 18 to the reel coupler base 20, and to allow the components to be selectively separated from each other. Indeed, in some embodiments, the coupling mechanism comprises one or more clamps, pins, detent pins, detents, catches, mechanical engagements, frictional engagements, slides, rails, guides, tracks, mating recesses, mating processes, mating elements, mating surfaces, and/or any other suitable mechanism that is configured to selectively couple the rod and the reel coupler bases with each other. In some embodiments, however, the coupling mechanism comprises one or more processes that are configured to mate with one or more recesses.

Where the coupling mechanism 22 comprises one or more processes and/or recesses, the coupling mechanism can function in any suitable manner. Indeed, in some embodiments, one or more processes on the rod coupler base 18 or the reel coupler base 20 are configured to be inserted into one or more corresponding recesses in the other of the rod coupler base and the reel coupler base. While such recesses and processes can be selectively coupled together in any suitable manner (e.g., via one or more catches, clamps, magnets, frictional engagements, and/or in any other suitable manner), in some embodiments, a pin (e.g., a detent pin, a cotter pin, a screw, a pawl, and/or any other suitable pin-like object) is inserted, so as to extend through a portion of the process and the material defining the recess.

In some other embodiments, the coupling mechanism 22 comprises one or more keyed recesses (e.g., slots, grooves, channels, holes, recessed slides, and/or any other suitable type of recesses) and one or more keyed processes (e.g., rails, inserts, protuberances, protrusions, nodules, prominences, catches, extending slides, and/or other suitable processes). In this regard, a keyed recess can be any suitable recess having a narrowed portion that is configured to capture a portion (e.g., a broadened or extending portion) of the process so as to slidingly mate with the process (e.g., such that the keyed process (or a process having a broadened portion) can only be released from the keyed recess at an open end of the recess and/or at another location that is missing the narrowed portion). Similarly, a keyed process can be any suitable process that is configured to slidingly mate with the keyed recess such that the keyed process can only be released from the keyed recess at an open end of the recess and/or at another location in the recess that is missing the narrowed or keyed portion.

In this regard, the keyed recess can have any suitable shape that allows it to function as described herein, including, without limitation, having a: dovetail shape, substantially cylindrical shape, prismatic shape, polygonal prismatic shape, symmetrical shape, asymmetrical shape, and/or any other suitable shape that allows it to be keyed to slidingly mate with a keyed portion of a process. Similarly, the keyed process can have any suitable shape that allows it to slidingly mate with and be captured by the keyed recess. By way of non-limiting illustration, FIGS. 2D, 3A, 3D, and 4A show some embodiments in which the recess 24 and the process 26 comprise a dovetail configuration.

While FIGS. 2D, 3A, 3D, and 4A show some embodiments in which the rod coupler base 18 comprises one or more recesses 24 and in which the reel coupler base 20 comprises one or more processes 26, the processes and the recesses can be disposed in any suitable location with respect to the fishing reel coupler 10. Indeed, in some embodiments, the rod coupler base comprises one or more processes 26. In some embodiments, the reel coupler base comprises one or more recesses. Moreover, in some embodiments, the reel coupler base and the rod coupler base each comprise one or more recesses and/or one or more processes.

Where the coupling mechanism 22 comprises one or more keyed recesses 24 and/or keyed processes 26, the keyed recess can be configured to release one or more keyed processes from any suitable portion of the keyed recess, including, without limitation, from an end (e.g., a top end, a butt end, and/or any other suitable end) of the elongated keyed recess, the rod coupler base 18, the reel coupler base 20, and/or any other suitable portion of the fishing reel coupler 10; from a side (e.g., a right side, a left side, a top side, a bottom side, a face, a back, and/or any other suitable side) of the elongated keyed recess, the rod coupler base 18, the reel coupler base 20, and/or any other suitable portion of the fishing reel coupler 10; and/or from any other suitable portion of the fishing reel coupler.

Figure 4A:
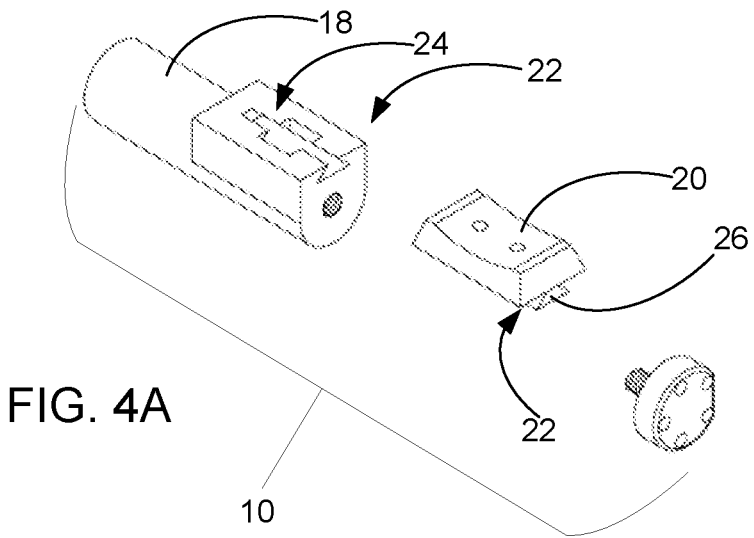
FIG. 4A illustrates an exploded, perspective view of the fishing reel coupler comprising a keyed recess having a non-keyed portion in accordance with a representative embodiment.
Figure 4B:
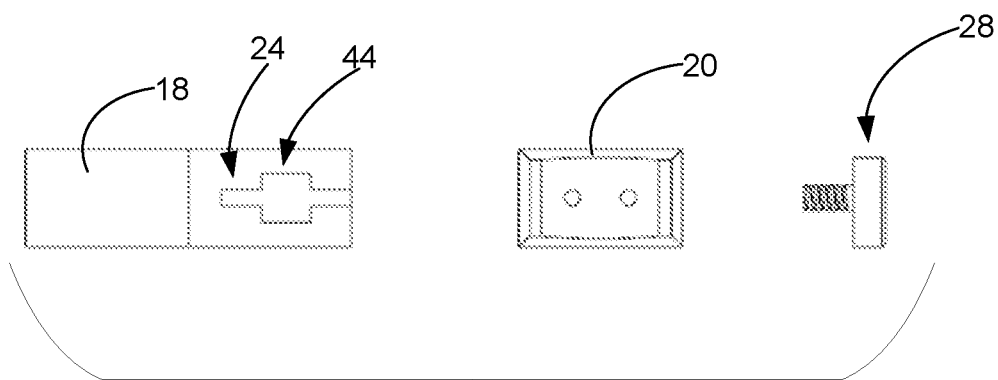
FIG. 4B illustrates a top, plan, exploded view of the fishing reel coupler of FIG. 3A.
Figure 4C:
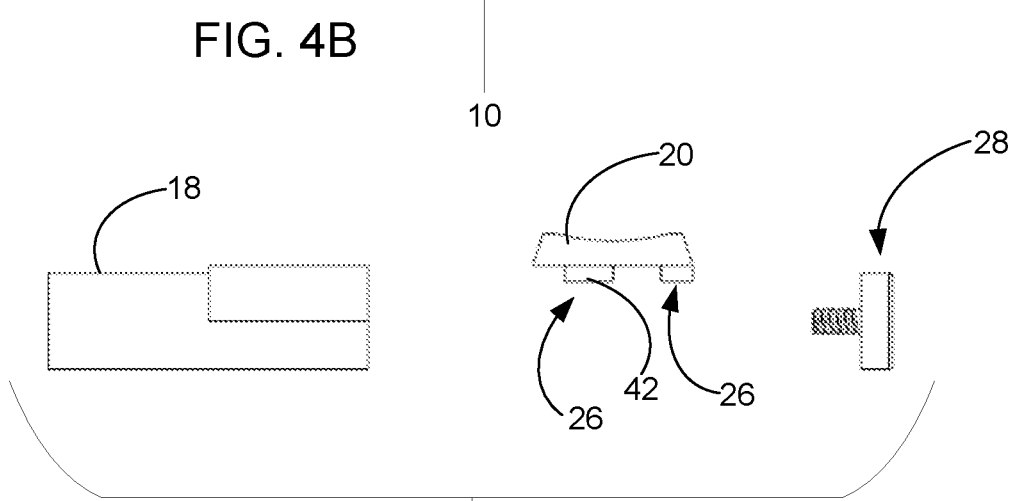
FIG. 4C illustrates a side, elevation, exploded view of the fishing reel coupler of FIG. 3C.
Figure 5A:
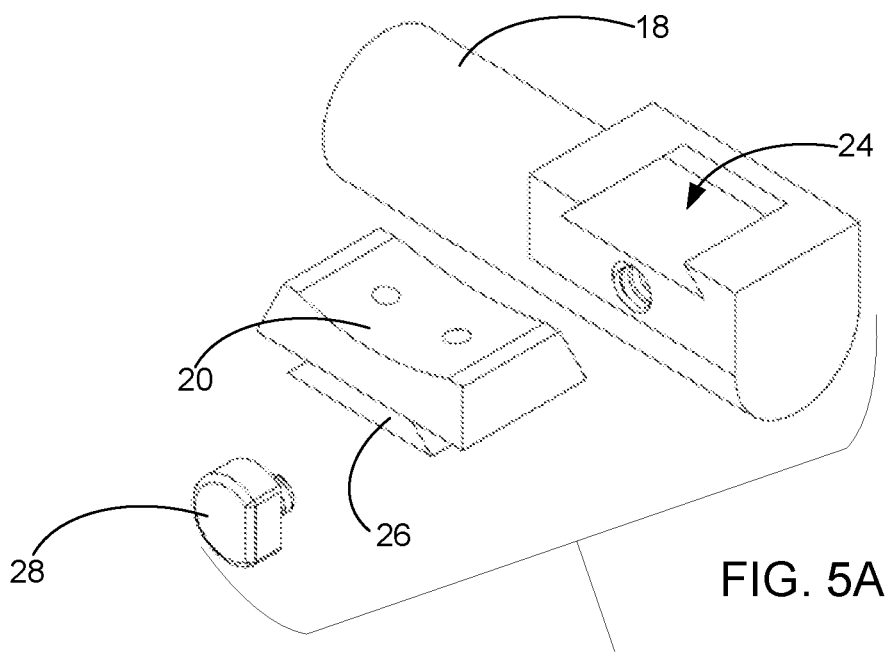
FIG. 5A illustrates an exploded, side, perspective view of the fishing reel coupler in which the reel coupler base is configured to couple to, and decouple from, a side of the rod coupler base in accordance with a representative embodiment.
Figure 5B:
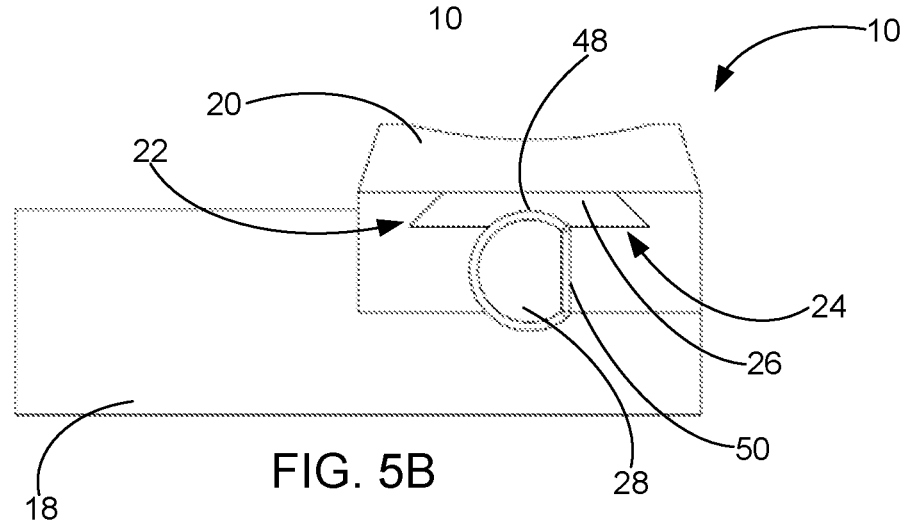
FIG. 5B illustrates a side, elevation view of the fishing reel coupler in accordance with representative embodiment.
Figure 5C:
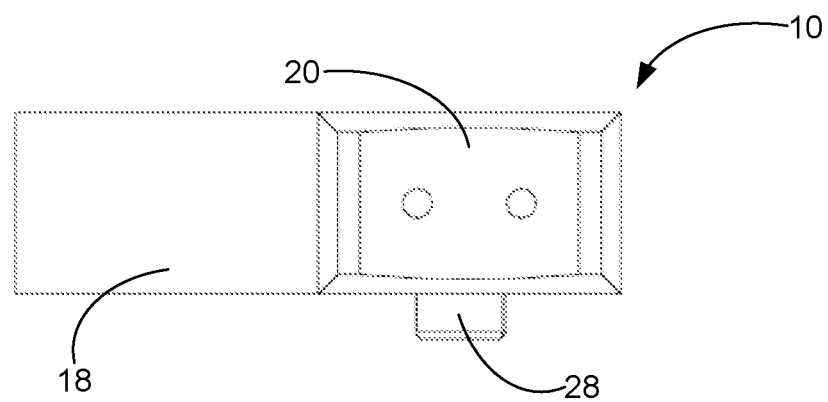
FIG. 5C illustrates a top, plan view of the fishing reel coupler in accordance with representative embodiment.

By way of non-limiting illustration, FIG. 2D shows an embodiment in which the keyed recess 24 is configured to only release the keyed process 26 from a butt end 40 of the recess 24. Moreover, FIGS. 4A-4C show some embodiments, in which one or more keyed processes 42 are configured to be released from a non-keyed portion 44 of the keyed process 24 (e.g., such that the reel coupler base only needs to slide a relatively short distance with respect to the rod coupler base to allow the two components to be separated). In yet another non-limiting illustration, FIGS. 5A-5C show some embodiments in which the keyed recess 24 is configured to selectively release the keyed process 26 from a side of the fishing reel coupler 10. In this regard, while FIG. 5A does not show that the recess 24 comprises a non-keyed portion 44, in some other embodiments, the recess 24 of the reel coupler 10 of FIG. 5A comprises one or more such non-keyed portions. Similarly, while FIGS. 5A and 5B show an embodiment in which the reel coupler base 20 comprises a single process 26, the fishing reel coupler 10 in such drawings can be modified to include any suitable number of processes, in any suitable configuration, including, without limitation, similar to what is shown in FIG. 4C, but with the processes 26 being oriented to allow the reel coupler base to be removed from a side of the fishing reel coupler 10.

Turning now to the reel coupler base lock 28, the lock can comprise any suitable mechanism that is capable of: (1) selectively locking the rod coupler base 18 and the reel coupler base 20 together and (2) allowing the rod coupler base and the reel coupler base to be selectively decoupled from each other. Some non-limiting examples of suitable locks include, one or more: quick-release mechanisms; detent mechanisms; pins; pawls; clamps; mechanical engagements; frictional engagements; rotatable objects that have a first portion that is configured to block the process 26 from being removed from the recess 24, and a second portion that is configured to allow the process to be removed from the recess; ratcheting mechanisms; and/or any other suitable mechanism that is configured to allow the lock to function as described herein. By way of non-limiting illustration, FIGS. 2D, 2F, 4A-C, and 5A-8C show some embodiments in which the lock 28 comprises a rotatable object 46 having a first portion 48 that is configured to at least partially block the process 26 from being removed from the recess 24 and a second portion 50 that is configured (e.g., when it is properly aligned with the process 26) to allow the process 26 to be removed from the recess 24.

Figure 6C:
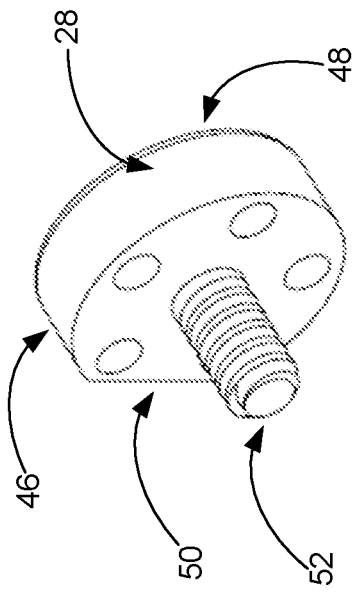
FIGS. 6A-6C respectively illustrate a side elevation view, an end elevation view, and a perspective view of a reel coupler base lock in accordance with a representative embodiment.
Figure 6B:
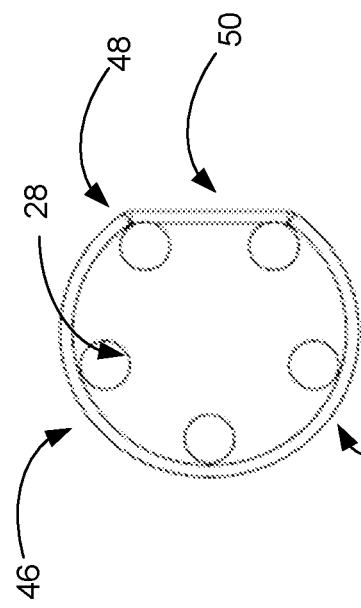
Figure 6A:
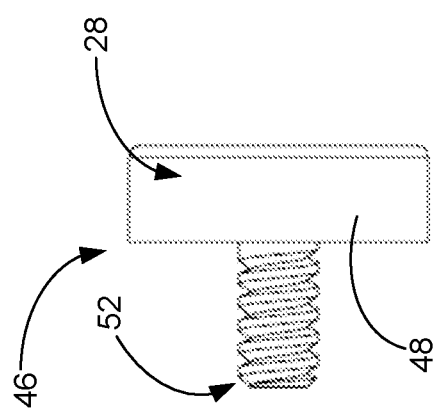
Figure 7A:
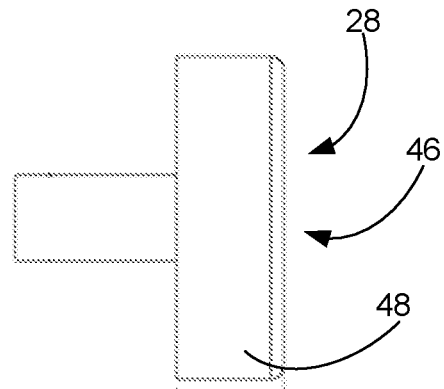
FIGS. 7A-7C respectively illustrate a side elevation view, an end elevation view, and a perspective view of a reel coupler base lock in accordance with some representative embodiments.
Figure 7B:
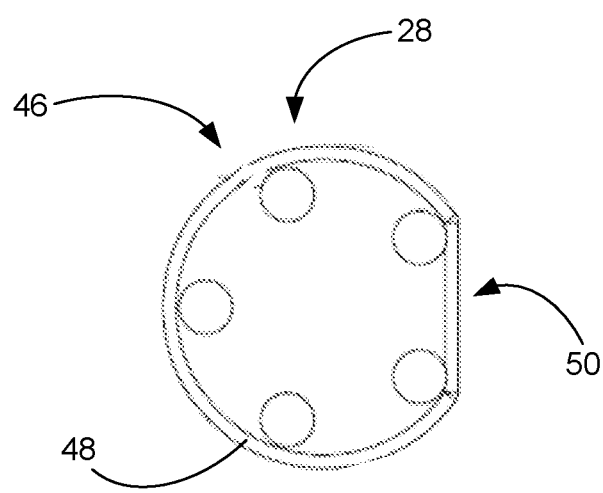
Figure 7C:
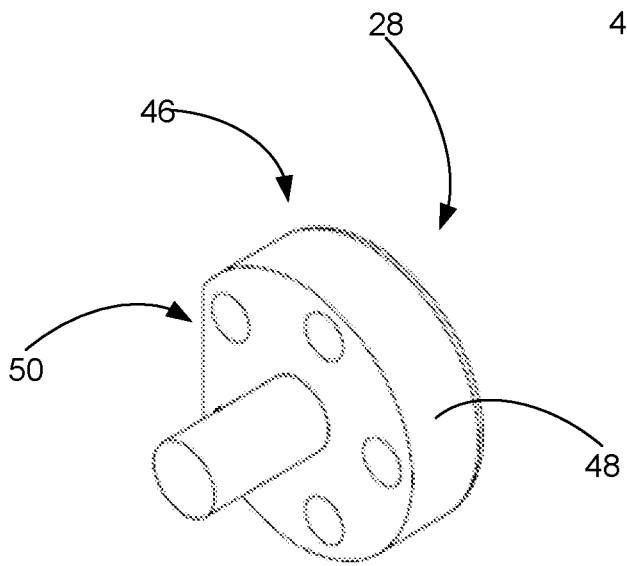

While the first portion 48 of the rotatable object 46 can comprise any suitable arm, extension, protuberance, protrusion, catch, lever, portion of a rotatable element, and/or other object that can be moved into place to block the process 26 from being removed from the recess 24 (and/or to otherwise prevent the reel coupler base 20 from being separated from the rod coupler base 18), FIGS. 6B and 6C show that, in some embodiments, the first portion 48 is simply a portion or a perimeter of an object (e.g., a knob) that extends out further (e.g., from a radial axis of the object) than does the second surface 50. Thus, in some embodiments that include a rotatable object 46 as part of the lock 28, the rotatable object can be: rotated to align the first portion with the process to lock the reel coupler base to the rod coupler base, and rotated to align the second portion with the process to selectively release the reel coupler base from the rod coupler base.

Where the lock 28 comprises a rotatable object 46 that is configured to be rotated to selectively lock the reel coupler base 20 to the rod coupler base 18, the rotatable object can be configured to rotate in any suitable manner, including, without limitation, by being rotatable about a threaded member; by comprising or being coupled to a detent mechanism that is configured to selectively hold and release the rotatable object in and from one of multiple positions (e.g., a locked position and a released position); by comprising or being coupled to a bearing; by comprising or being coupled to a pivot joint; by being rotatable between the locked position and the release position, while being biased (e.g., via a spring or otherwise) towards the locked position; and/or in any other suitable manner. By way of non-limiting illustration, FIGS. 6A and 6C show some embodiments in which the rotatable member 46 is configured to rotate about a threaded shaft 52.

Additionally, FIGS. 8A-8B show some embodiments in which the rotatable object 46 is rotatable about a threaded member 54. Thus, in some embodiments, by simply rotating the rotatable object by a small amount can determine whether or not the process 26 can move through the recess 24 such that the reel coupler base 20 can move with respect to the rod coupler base 18. Indeed, in some embodiments, when the rotatable object is fully tightened in place, the first portion 48 of the rotatable object is configured to block the process. In some such embodiments, when the rotatable object 46 is loosened a little (e.g., to move the first portion 48 of the rotatable object 46 out of alignment with the process 26; e.g., as shown in FIG. 8C), the reel coupler base 20 can easily be separated from the rod coupler base 18.

In addition to the aforementioned components and characteristics, the described fish reel coupler 10 can be modified in any suitable manner. In one example, fishing reel coupler comprises one or more weights that can be added to the lock 28 (e.g., the rotatable object 46), the rod coupler base 18, the reel coupler base 20, and/or to any other suitable portion of the fishing reel coupler). Indeed, in some embodiments, such a weight can readily help provide the user with a balanced fishing pole, where the pole's balance is tailored to that particular user's desired balance point (e.g., based on a foremost location on the pole in which the user holds the user's fingers while fishing). While such a weight can have any suitable characteristic, in some embodiments, the rotatable object is sold in multiple sizes and/or weights, such that one rotatable object can be switched out with another to shift a balance of the fishing pole.

In one example, the butt end of the fishing reel coupler 10 (e.g., the butt end 40 of the rod coupler base 18 and/or the lock 28) comprises a rod butt cap, a fishing rod butt cushion, a fighting butt cap, a standard butt cap, a gimbal, and/or any other suitable component. Indeed, in some embodiments, the butt end of the fishing reel coupler comprises a gimbal that is rounded, slotted, tapered, and/or otherwise shaped to help hold the butt end of the fishing reel coupler in a gunnel, a gunnel rail, a stand-up fighting pole holder, a fighting belt waist holder, a rod belt, a fishing belt, and/or any other suitable pole holder.

In addition to the described characteristics, the fishing reel coupler 10 can have any other suitable characteristic. Indeed, in some embodiments, the fishing reel coupler is configured to be relatively easy to use; to be resistant to wear; to help balance the fishing rod; to quickly allow a user to remove, replace, and/or swap out the reel; and/or to perform any other suitable function.

The various components of the described fishing reel coupler 10 can comprise any suitable material, including, without limitation, one or more types of: metal (e.g., one or more types of titanium, aluminum, anodized aluminum, stainless steel, cobalt chromium, cobalt-chromium-molybdenum, alloys, and/or any other suitable metal), polyvinyl chloride, plastic (e.g., polyethylene, high density polyethylene plastic, ultra-high-molecular-weight polyethylene, polypropylene, PVC sheet board, and/or any other suitable plastics), polymer, resin, ceramics, fiberglass, rubbers, polymers, pre-preg, aramid fibers, woods, carbon fibers, natural materials, synthetic materials, ultra-high-molecular weight (UHMW) materials (e.g., ultra-high-molecular weight polyethylene and/or other UHMW materials), and/or any other suitable materials. Indeed, in some embodiments, the rod coupler base 18, the reel coupler base 20, the reel coupler base lock 28, and/or any other suitable portion of the fishing reel coupler comprises titanium and/or anodized aluminum. In some other embodiments (e.g., where the fishing reel coupler is intended to be used as "swag" and/or for other promotional purposes), one or more components of the fishing reel coupler comprise a polymer (e.g., PVC).

The described fishing reel coupler 10 can also be made in any suitable manner. In this regard, some non-limiting examples of methods for making the fishing reel coupler include, injection molding, extruding, machining, cutting, folding, bending, shaping, drilling, using a computer numerical control device, 3D printing, additive manufacturing, welding pieces together, connecting various pieces with one or more adhesives, mechanical fasteners (e.g., clamps, rivets, crimps, pins, brads, nails, staples, pegs, clips, screws, bolts, threaded attachments, couplers, etc.), and/or any other suitable method that allows the described system to perform its intended functions.

Thus, some embodiments of the described systems and methods relate to fishing rods (or fishing poles). More particularly, some embodiments relate to systems and methods for selectively coupling a fishing reel to a fishing rod, and for selectively decoupling the fishing reel from the fishing rod, via a fishing reel coupler. While the described fishing reel coupler can include any suitable component, in some embodiments, it includes a rod coupler base that couples to a fishing rod, and a reel coupler base that couples to a fishing reel, and that selectively couples to the rod coupler base via a base coupler coupling mechanism. In some embodiments, the coupling mechanism includes a process on either the rod or the reel coupler base, and a corresponding recess in the other of the rod and the reel coupler base, with the process being configured to slidingly mate with the recess. In some embodiments, the reel coupler includes a reel coupler base lock that is configured to move between a locked position (where a first portion of the lock is configured to block a portion of the process in the recess so as to prevent the process from sliding out of the recess), and a release position (where the lock allows the process to slidingly decouple from the recess).

The described systems and methods may be embodied in other specific forms without departing from its spirit or essential characteristics. The described embodiments, examples, and illustrations are to be considered in all respects only as illustrative and not restrictive. The scope of the described systems and methods is, therefore, indicated by the appended claims rather than by the foregoing description. Each of the various elements of the described embodiments, implementations, figures, and examples can be mixed and matched with each other in any suitable manner. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A fishing reel coupler comprising:
   a rod coupler base that is configured to couple to a fishing rod, the rod coupler base comprising a distal end and a proximal end, wherein the distal end is disposed closer to a tip top of the fishing rod than is the proximal end when the rod coupler base is coupled to the fishing rod;
   a reel coupler base that is configured to couple to a fishing reel, and that is configured to selectively couple to, and to selectively decouple from, the rod coupler base via a base coupler coupling mechanism that comprises:
   at least one of a process and a recess of the rod coupler base, and
   at least one of a process and a recess of the reel coupler base, with the at least one of the process and the recess of the rod coupler base being configured to slidingly mate with the at least one of the process and the recess of the reel coupler base; and
   a reel coupler base lock that is configured to move between: (a) a locked position in which a first portion of the reel coupler base lock is configured to block a portion of at least one of the reel coupler base and the rod coupler base from sliding with respect to the other of the reel coupler base and the rod coupler base, and (b) a release position in which the reel coupler base lock is configured to allow the rod coupler base and the reel coupler base to slidingly decouple from each other, wherein the reel coupler base selectively couples to the rod coupler base by sliding from the proximal end of the rod coupler base towards the distal end of the rod coupler base, and wherein a proximal end of the reel coupler base abuts a portion of the reel coupler base lock when the reel coupler base lock is in the locked position.

2. The fishing reel coupler of claim 1, wherein at least one of the rod coupler base and the reel coupler base comprises a keyed recess, and wherein the other of the rod coupler base and the reel coupler base comprises a keyed process that is configured to slidingly mate with the keyed recess.

3. The fishing reel coupler of claim 2, wherein the keyed recess comprises a closed end and a opened end that is disposed opposite to the closed end, wherein the keyed recess further comprises a non-keyed portion that is configured to allow a first keyed portion of the keyed process to be removed from the keyed recess, through the non-keyed portion of the keyed recess, without requiring the first keyed portion of the keyed process to be pulled out of the keyed recess through the opened end of the keyed recess.

4. The fishing reel coupler of claim 3, further comprising a second keyed portion of the keyed process, wherein the second keyed portion of the keyed process is configured to be released from the open end of the keyed recess when the first keyed portion of the keyed process is released through the non-keyed portion of the keyed recess.

5. The fishing reel coupler of claim 2, wherein the keyed process is configured to slide along a length of the keyed recess that extends between the distal end and the proximal end of the rod coupler base.

6. The fishing reel coupler of claim 1, wherein the reel coupler base selectively couples to the rod coupler base by sliding past the reel coupler base lock in a distal direction.

7. The fishing reel coupler of claim 1, wherein the rod coupler base defines a keyed recess, and wherein the reel coupler base comprises a keyed process that is configured to slidingly mate with the keyed recess.

8. The fishing reel coupler of claim 7, wherein the reel coupler base lock comprises a rotatable element having a first portion that is configured to be moved to block the keyed process from sliding out of the keyed recess, and wherein the rotatable element comprises a second portion that is configured to be moved to allow the keyed process to slide out of the keyed recess and past the second portion of the rotatable element.

9. The fishing reel coupler of claim 8, wherein the rotatable element is threadingly coupled to the rod coupler base.

10. A fishing reel coupler comprising:

a rod coupler base that is configured to couple to a fishing rod, wherein the rod coupler base comprises one of a keyed process and a keyed recess, wherein the rod coupler base comprises a distal end and a proximal end, and wherein the distal end is disposed closer to a tip top of the fishing rod than is the proximal end when the rod coupler base is coupled to the fishing rod;

a reel coupler base that comprises the other of the keyed process and the keyed recess, wherein the reel coupler base is configured to couple to a fishing reel, and wherein the one of the keyed process and the keyed recess of the rod coupler base is configured to selectively and slidably mate with, and to selectively and slidably decouple from, the other of the keyed process and the keyed recess of the reel coupler base; and a reel coupler base lock that is configured to selectively rotate between: (a) a locked position in which a first portion of the reel coupler base lock prevents a portion of the reel coupler base from sliding with respect to the rod coupler base and vice versa, and (b) a release position in which the reel coupler base lock is configured to allow the rod coupler base and the reel coupler base to slidingly decouple from each other, wherein the reel coupler base lock is configured to rotate about a longitudinal axis that extends between the distal end and the proximal end of the rod coupler base.

11. The fishing reel coupler of claim 10, wherein the reel coupler base lock comprises a substantially cylindrical shape and an outer surface having the first portion which is curved, and a second portion which is flat to allow the rod coupler base and the reel coupler base to slidingly decouple from each other.

12. The fishing reel coupler of claim 11, wherein the reel coupler base lock comprises ridges around the substantially cylindrical shape.

13. The fishing reel coupler of claim 10, wherein the reel coupler base lock is biased toward the locked position.

14. The fishing reel coupler of claim 10, wherein the reel coupler base lock is configured to be easily switched out with a second reel coupler base lock with a different weight to shift a balance of the fishing rod.

15. The fishing reel coupler of claim 10, wherein the reel coupler base lock is coupled to the rod coupler base using one or more of the following mechanisms: a quick-release mechanism, a detent mechanism, pins, pawls, clamps, mechanical engagements, or frictional engagements.

16. The fishing reel coupler of claim 10, wherein the reel coupler base lock comprises a threaded shaft, and wherein the rod coupler base is configured to receive the threaded shaft of the reel coupler base lock.

17. The fishing reel coupler of claim 10, wherein the rod coupler base comprises a threaded member, and wherein the reel coupler base lock is rotatable about the threaded member of the rod coupler base.

18. A fishing reel coupler comprising:

a rod coupler base that is configured to couple to a fishing rod, wherein the rod coupler base comprises a keyed recess, a distal end, and a proximal end, and wherein the distal end is disposed closer to a tip top of the fishing rod than is the proximal end when the rod coupler base is coupled to the fishing rod;

a reel coupler base that comprises a keyed process, wherein the reel coupler base is configured to couple to a fishing reel, and wherein the keyed process of the reel coupler base and the keyed recess of the rod coupler base are configured to selectively and slidably mate with, and to selectively and slidably decouple from, each other; and a reel coupler base lock that is rotatably coupled to the rod coupler base about a longitudinal axis that extends between the distal end and the proximal end of the rod coupler base, wherein the reel coupler base lock is configured to selectively rotate between: (a) a locked position in which a distal end of the reel coupler base lock abuts a proximal end of the keyed process so as to prevent it from being extracted when the keyed process is in the keyed recess and the reel coupler base lock is in the locked position, and (b) a release position in which the reel coupler base lock is configured to allow the keyed process to slide out of the keyed recess and past the reel coupler base lock when the keyed process is disposed in the keyed recess and when the reel coupler base lock is disposed in the release position.

19. The fishing reel coupler of claim 18, wherein the keyed recess comprises an open end that is configured to selectively release and selectively receive the keyed process from and at the proximal end of the rod coupler base.

20. The fishing reel coupler of claim 18, wherein the keyed recess comprises an open end that is configured to selectively release and selectively receive the keyed process from and at a side of the rod coupler base that is disposed between the proximal end and the distal end of the rod coupler base.

* * * * *